Figure 1:
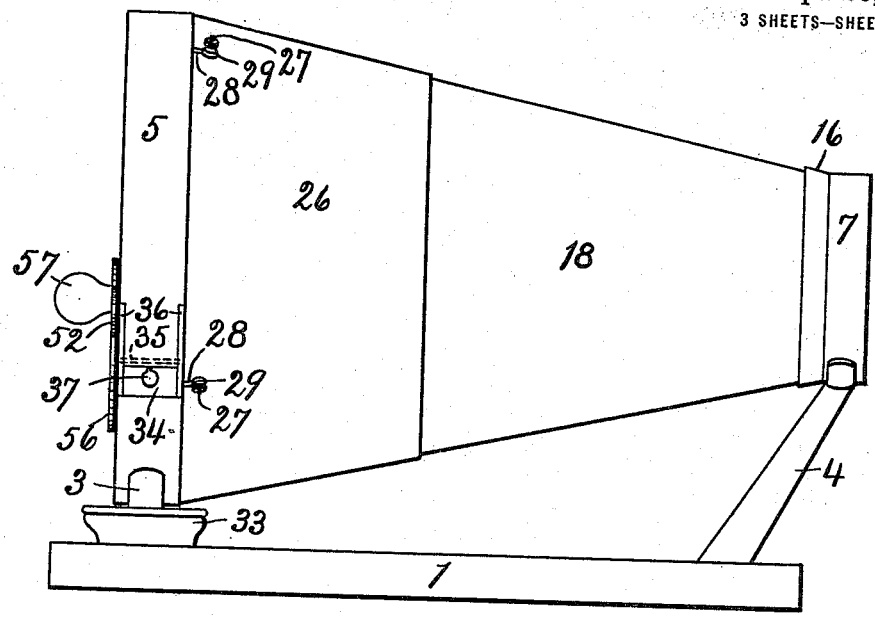

W. A. SMITH & T. L. FLYNN.
SUGAR DISPENSER.
APPLICATION FILED JULY 31, 1914.

1,155,013.

Patented Sept. 28, 1915.
3 SHEETS—SHEET 1.

WITNESSES:
A. C. Fairbanks.
H. D. Cutter.

INVENTORS:
Walter A. Smith
Thomas L. Flynn,
BY
Webster & Co.
ATTORNEYS.

W. A. SMITH & T. L. FLYNN.
SUGAR DISPENSER.
APPLICATION FILED JULY 31, 1914.
1,155,013.
Patented Sept. 28, 1915.
3 SHEETS—SHEET 2.
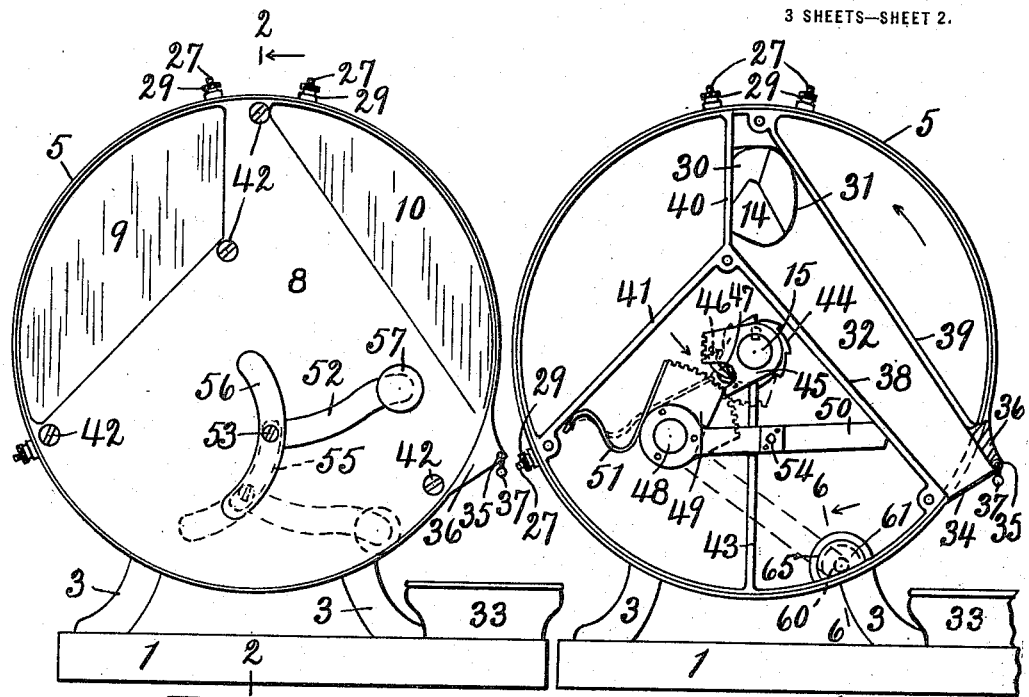
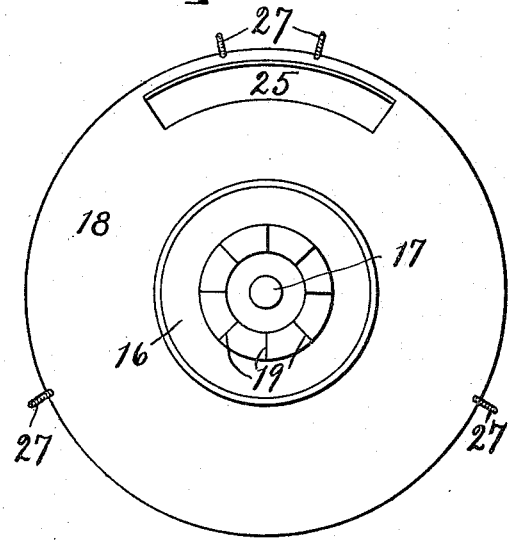
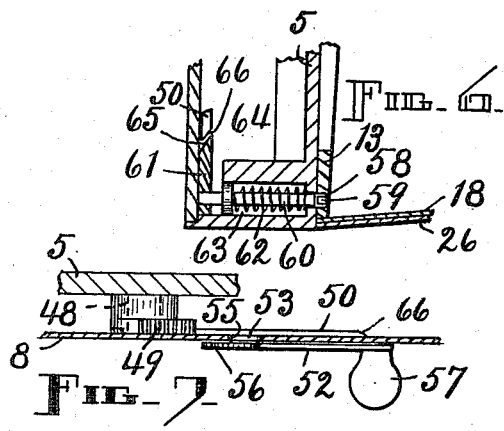
WITNESSES:
A. C. Fairbanks
H. G. Cutter
INVENTORS:
Walter A. Smith
Thomas L. Flynn,
BY
Webster & Co.,
ATTORNEYS.

W. A. SMITH & T. L. FLYNN.
SUGAR DISPENSER.
APPLICATION FILED JULY 31, 1914.

1,155,013.

Patented Sept. 28, 1915.
3 SHEETS—SHEET 3.

WITNESSES:
A. C. Fairbanks
H. D. Cutter

INVENTORS:
Walter A. Smith
Thomas L. Flynn,
BY
Webster & Co.,
ATTORNEYS.

UNITED STATES PATENT OFFICE.

WALTER A. SMITH AND THOMAS L. FLYNN, OF SPRINGFIELD, MASSACHUSETTS.

SUGAR-DISPENSER.

1,155,013.   Specification of Letters Patent.   Patented Sept. 28, 1915.

Application filed July 31, 1914.  Serial No. 854,271.

*To all whom it may concern:*

Be it known that we, WALTER A. SMITH and THOMAS L. FLYNN, both citizens of the United States of America, and residents of Springfield, in the county of Hampden and State of Massachusetts, have invented a new and useful Sugar-Dispenser, of which the following is a specification.

Our invention relates to devices for delivering sugar in predetermined amounts or quantities upon the manipulation of a crank or lever and resides in a stationary, conical, sugar container provided with a plurality of receptacles or buckets, each of a size to hold the amount or quantity of sugar required for a delivery, and mounted to rotate intermittently, certain peculiar operating and controlling means and mechanism for said container, a delivery chute, and such other parts and members as may be requisite for or desirable adjuncts to a complete machine, all as hereinafter set forth.

The objects of our invention are, first, to produce a machine, of the class specified above, which is capable of dispensing sugar, either loaf or granulated, in predetermined amounts or quantities with accuracy, certainty and despatch, until the last lump or the last particle of sugar is removed from the container; second, to provide such a machine with convenient and efficient mechanism for operating the same; third, to provide the machine with convenient filling means, and, fourth, so to construct the machine that its contents is fully protected from dust and dirt, and to prevent such contents from being handled before actual delivery of the same takes place.

This machine is intended more especially for use in public eating houses where open sugar bowls are objectionable for sanitary and other reasons.

Other objects and advantages will appear in the course of the following description.

A preferred form or embodiment of the invention, whereby we attain the objects and secure the advantages of the same, is illustrated in the accompanying drawings, and we will proceed to described the invention with reference to said drawings, although it is to be understood that the form, construction, arrangement, etc., of the parts in various aspects are not material and may be modified without departure from the spirit of the invention.

Figure 2:
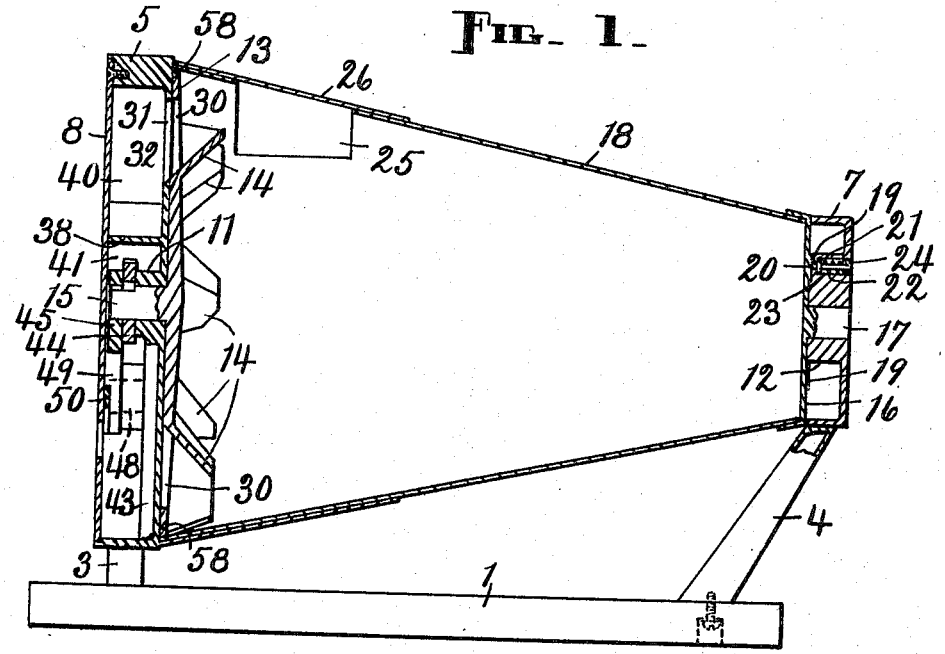
Figure 8:
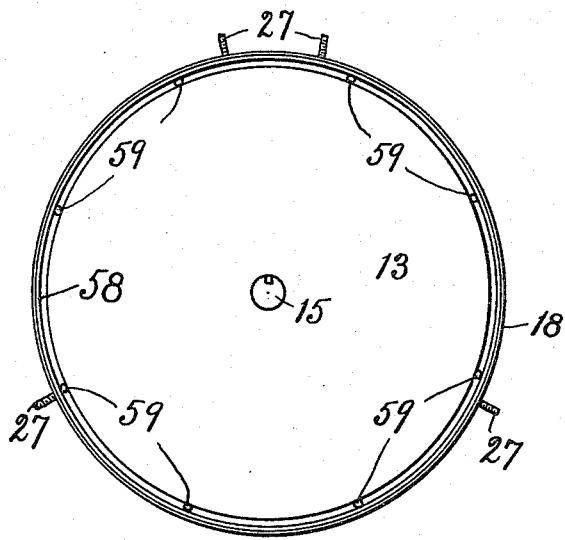
Figure 7:
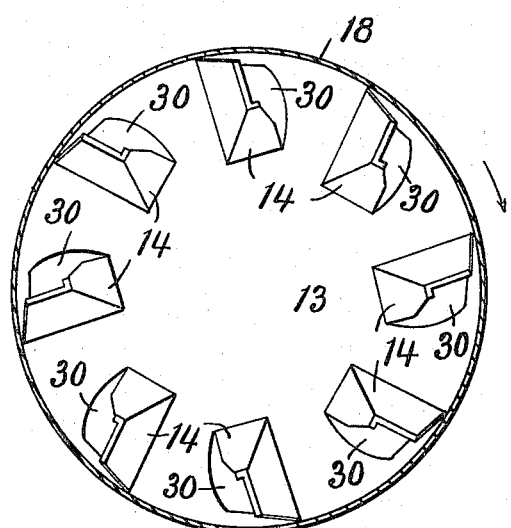

In the drawings, in which like numerals designate like parts throughout the several views, Figure 1 is a side elevation of a machine as aforesaid; Fig. 2, a central, longitudinal, vertical section through said machine, taken on lines 2—2, looking in the direction of the associated arrow, in Fig. 3; Fig. 3, a front elevation of said machine, the low position of the operating arm being represented by broken lines; Fig. 4, a front end elevation, without the front plate, the movable parts therein shown being represented by broken lines in the positions which they occupy when said operating arm is moved down to the end of its active stroke; Fig. 5, a rear end elevation of the container; Fig. 6, an enlarged detail in section of the stop mechanism, taken on lines 6—6, looking in the direction of the associated arrow, in Fig. 4; Fig. 7, a detail in top plan of parts of the operating mechanism, the fragments of the case members shown being in section; Fig. 8, a front end elevation of the aforesaid container, and, Fig. 9, an inside elevation of the front end of said container.

As a base or support for the machine or dispenser we have here provided a horizontal plate 1 having mounted thereon a pair of front feet 3 and a rear leg 4. An annular housing 5 is mounted securely in a vertical position on the feet 3, and a somewhat similar though smaller housing 7 is mounted vertically on the leg 4, the proportions of parts being such that the horizontal axes of said housings are in line with each other. The front side of the housing 5 is open, and a cover, which may consist of a metal plate 8 and glass plates 9 and 10, is provided with which to close said front side of said housing. The housings 5 and 6 respectively are provided with forwardly extending bearings 11 and 12.

A container for the sugar is mounted to rotate between the housings 5 and 7, such container consisting of a large front end disk 13 provided on the back side with a series of receptacles or buckets 14, and having a trunnion 15 journaled in the bearing 11, a small rear end disk 16 having a trunnion 17 journaled in the bearing 12, and a hollow connecting truncated cone 18 which constitutes the sides or the horizontal part of said container.

The rear end disk 16 is provided on the back side around the trunnion 17 with a series of teeth 19, and a horizontal spring-pressed pin 20 is arranged in an enlarged part of the bearing 12 to engage said teeth, as shown in Figs. 2 and 5. The pin 20 has a flange 21 which, with a spring 22, is received in a recess 23 in the aforesaid bearing enlargement. The spring 22 encircles the pin 20, between the flange 21 and a screw plug 24 in the outer end of the recess or passage 23, and so forces said pin forwardly or inwardly with its front or inner end in engagement with the teeth 19. The purpose of the pin 20 and the teeth 19 is to steady and regulate the rotary motion of the conical container and prevent back-lash on the part thereof, hence there should preferably be the same number of said teeth as there are buckets 14.

The cone 18 has a filling opening 25 therein, and is provided with a conical sleeve 26 which serves as a cover for said opening. A series of radial screw-threaded posts 27 is set in the cone 18 to project beyond the outside thereof, and the sleeve 26 has a corresponding number of slots 28 in the large end to receive said posts when said sleeve is pushed forward on said cone to close the opening 25 therein. Thumb-nuts 29 are placed on the posts 27, and when tightened on the sleeve 26 hold the same securely in place.

To uncover the opening 25, the thumb-nuts 29 is loosened and the sleeve 26 slipped rearwardly, and then, to close said opening, said sleeve is slid forward, care being taken that the slots 28 aline with the posts 27, until the front end of said sleeve contacts with the back side of the housing 5, and said thumb-nuts are retightened.

There are in this case eight buckets 14, but this number may vary in different machines, and said buckets are arranged at equal distances from each other around the disk 13 near the periphery thereof and within the cone 18. Each bucket 14 consists of a side piece which is behind in the direction of rotation of the container, and of a bottom piece which extends from the end of said side piece that is nearer the axial center of the disk 13. The side and bottom of each bucket 14 are oblique to the disk 13 and to each other, as shown in Figs. 2, 4 and 9, each being shorter at the inner edge than at the edge which joins said disk, so that the contents of such bucket will of its own weight slide forward out of the bucket when the latter is at the highest point in the circular path of its travel. An opening 30 is made in the disk 13 directly in front of each bucket 14, through which the sugar is permitted to escape from the bucket when the latter arrives at the high point or place of delivery. In order to insure the complete discharge of the contents of each bucket 14, or to prevent such contents from falling back into the cone 18, the floor of the bucket is arranged obliquely to a radius of the disk 13 drawn from the center of such disk to the angle formed by said floor with the associated side, and by preference the latter is also arranged obliquely to such radius, the slant of the bottom being toward the periphery of said disk and that of said side being away from said radius in the direction of rotation.

There is a discharge opening 31 in the vertical plate of the housing 5, just below the rim of such housing at the top, which opening corresponds substantially with the shape and size of any one of the openings 30. Thus, as each bucket 14 arrives behind the opening 31, the contents of said bucket escapes through the opening 30 in front of said bucket and through said opening 31 into the top of a chute 32 in the housing 5. All of the other openings 30 are closed by the housing 5 with the back side of which the disk 13 contacts, and the edges of said openings as they pass over said back side of the housing scrape off any sugar that may work down between the contacting surfaces and so prevent any accumulation between such surfaces that might cause the parts to bind, the sugar thus scraped off being carried to the opening 31 and discharged therethrough.

The chute 32 inclines downwardly and away from the vertical center of the housing 5 on one side to open at the bottom over a receiver 33 on the base plate 1. The sugar may be discharged into the receiver 33, or into the hand held under the discharge end of the chute 32, or into a cup placed beneath such end of said chute, as desired. A door 34 is provided for the lower end of the chute 32, such door being pivoted at 35 to an exterior extension 36 of said chute, and counterweighted at 37. The counterweight 37 makes the door 34 self-closing and retains it closed normally, but does not prevent the door from opening, when a quantity of sugar slides down the chute 32 onto the same, and permitting the sugar to escape.

The chute 32 has a portion of the vertical part of the housing 5 and a part of the extension 36 for the back side, and a portion of the metal plate 8 and another part of said extension for the front side, while the bottom or floor and the top of said chute consist in the main respectively of wide ribs 38 and 39 within said housing, such ribs extending clear across the space between said vertical part of the housing and said plate. Still another part of the extension 36 serves as a top element of the chute 32, in connection with the rib 39. A continuation of the rib 38 is represented at 40, the part 40 completing the chute 32 at the upper end. A rib 41 extends downwardly, from the junction between the ribs 38 and 40, in a divergent course to that of said rib 38. The metal plate 8 is shaped to cover the spaces between the ribs 41, 40 and 39, and the glass plates 9 and 10 respectively cover the spaces located outside of said ribs 41 and 40 and said rib 39, thus rendering said last-mentioned spaces available for advertising purposes. The plate 8, with the plates 9 and 10, is secured in place by means of screws 42 which pass through said plate 8 into threaded engagement with suitable lugs in the housing behind. The operating mechanism for the container, which is described below, is mostly contained within the space between the ribs 41 and 38. The rib 43 is merely for stiffening and strengthening purposes.

Keyed or otherwise secured on the trunnion 15, in front of the bearing 11, is a ratchet-wheel 44, and mounted loosely on said trunnion, in front of said ratchet-wheel, is a toothed segment 45. Pivotally attached at 46 on the back side of the segment 45 is an ordinary spring-pressed pawl 47 which engages the teeth on the ratchet-wheel 44. In Fig. 4 a portion of the segment 45 is broken away to show a part of the pawl 47 in full. The teeth on the ratchet wheel 44 number the same as the buckets 14, for reasons that will presently appear, if not already obvious.

A stud 48 extends into the housing 5 from the back thereof, at the left of the rib 43, and loosely mounted on said post is a second toothed segment 49 which is adapted to engage with and actuate the first. Having one end rigidly attached to the segment 49 is an operating lever 50, which extends to the right from said segment. A spring 51 is fastened at one end to the segment 49 and bears at the other end against the rib 41, and said spring is arranged and adapted to retain normally said segment with the segment 45 in initial position, the lever 50 determining such position by reason of its engagement at the free end with the rib 38, which engagement checks the upward movement of said lever, and to return said segment 49 with its companion to said position when said lever is released at the end of its down or operative stroke.

An exterior operating arm 52 is provided for the lever 50, such arm having one end rigidly attached by a screw 53 to said lever intermediate of the ends of the latter, such point of attachment being indicated at 54 in Fig. 4, and the arm and lever connections being clearly shown in Fig. 7. The screw 53 passes through and operates in a segmental slot 55 in the plate 8, such slot having the stud 48 for a center, and a segmental extension of the arm 52, which extension is double the length of said slot, serves as a cover 56 for the slot at all times and regardless of the position of said arm. At the free end of the arm 52 is a handle 57.

Upon grasping the handle 57 and forcing down the arm 52, the lever 50 is swung down with said arm and actuates the segment 49, against the resiliency of the spring 51, and said segment in turn actuates the segment 45 and with it, through the medium of the pawl 47, the ratchet-wheel 44, with the result that the container is given a partial revolution, since said ratchet-wheel is secured to the trunnion 15. Through the medium of the stop means, which will next be described, this partial revolution is one-eighth of a revolution or equal to the distance between two adjacent buckets 14, and the arrangement is such that, at the end of such movement, one of said buckets is properly positioned at the opening 31. Upon the release of the handle 57 the spring 51 acts to return the segments together with the lever and arm to initial positions, the pawl 47 riding over the next ratchet-wheel tooth in its path at this time, so that the container is left undisturbed, and taking engaging position relative to the next tooth in order.

It is understood that the pin 20 does not offer sufficient resistance to interfere with the rotation of the container in the manner and by the means described above, but does afford the required amount of resistance to hold said container against rotary motion or movement between the periods of positive rotation thereof by the arm 52 and connected parts when said arm is carried down for that purpose.

Having special reference to Figs. 4, 6 and 8, it will be observed that the disk 13 has an annular groove 58 in the front face or side a short distance in from the periphery thereof, and that there are eight pins 59 set in said groove at equal distances from each other, and it will be observed, furthermore, that a horizontal pin 60, provided at the front end with a head 61, is located in the bottom part of the housing 5 in line with said groove, a passage 62 being made in an enlarged or thickened part of said housing to receive said pin and a spring 63. The spring 63 encircles the pin 60 between a flange 64 thereon just back of the head 61 and the shoulder formed by the constricted part of the passage 62 at the rear end where said passage opens adjacent to the groove 58, and thus said spring normally forces said pin forward out of the path of the pins 59 and with said head in the path of the free terminal portion of the lever 50. The lower edge of the head 61 may bear on the bottom of the housing 5 and thus be prevented from turning, and the forward thrust of the pin 60 with said head, under the influence of the spring 63, is limited by the plate 8. The curved portion of the edge of the head 61 is beveled, as shown at 65, so also is the contacting portion of the lever 50, as shown at 66, in Fig. 6.

From the foregoing it is clear that, when the lever 50 is moved downward, said lever encounters near the end of the down stroke the head 61, owing to the position of the parts, and that, when such encounter takes place, the beveled surfaces 66 and 65 come into contact and said head and the pin 60 are forced rearwardly, against the resiliency of the spring 63, far enough to locate the back end of said pin in the path of the next adjacent pin 59 advanced by the very act of depressing said lever. As soon as the aforesaid pin 59 strikes the end of the pin 60 which is in the groove 58 the movement of the container is thereby caused to cease, said container being thus stopped when one of the buckets 14 or the opening 30 associated therewith is in exact registry with the opening 31, by reason of the relation of parts involved in producing such result. Upon the release of the lever 50 to the action of the spring 51, said lever rises and releases the head 61 and the pin 60 to the spring 63, and said pin is instantly withdrawn from the groove 58, thus leaving the container free or its path clear for the next eighth of a revolution, near the end of which said pin is again thrust into the path of the next advancing pin 59. In this way the container is stopped eight times in a complete revolution and each time presents a bucket 14 at the opening 31 in position to discharge its contents into the chute 32.

The operation of the machine as a whole will be very well understood from the foregoing, so that the following brief recapitulation is all that need be added in relation thereto. After the container receives its supply of sugar through the opening 25, such opening being uncovered and again covered in the manner previously explained, the machine is ready for use. Then, whenever a quantity of sugar is required, the operator simply presses down the arm 52, and the sugar is delivered immediately through the chute 32, the resulting delivery being brought about by the action produced by the lever 50, through the medium of the intermeshing segments and pawl and ratchet mechanism, on the container, and by the action produced by said lever on the stop pin 60. In this connection see dotted lines in Fig. 4. The arm 52 is then released or moved upward to reset the actuating parts and members and to permit the pin 60 to release the container. These operations are repeated each time a quantity of sugar is required and until the container is empty.

It will be readily understood that, as the container is rotated, the contents thereto tends constantly to gravitate toward the larger end of the cone 18, where the buckets 14 are located, and that such contents must all sooner or later enter said buckets and be removed thereby from the container. This is an important and valuable feature of our invention, because it is undesirable in a sugar dispenser to have sugar left in any part thereof for a long time, or to have, rather, any part in which sugar can be left, provided the device be used, and it is also very desirable that the whole mass of sugar be frequently agitated and moved about, as in our machine.

What we claim as our invention, and desire to secure by Letters Patent, is—

1. A sugar dispenser comprising a conical container rotatable on a horizontal axis and provided inside against the vertical wall at the large end with a receptacle, such wall having an opening therein between the axial center and periphery thereof and at the edge of which said receptacle is located, and a delivery member, outside of said wall but adjacent to the outer surface thereof with which said receptacle is adapted to be brought into communication through said opening.

2. A sugar dispenser comprising a conical container rotatable on a horizontal axis and provided inside against the vertical wall at the large end with receptacles, such wall having openings therein between the axial center and periphery thereof and at the edges of which said receptacles are arranged, an exterior delivery member with which said receptacles are adapted to be brought sequentially into communication through said openings, said delivery member being adjacent to the outer surface of said wall, and means to rotate said container intermittently.

3. A sugar dispenser comprising a conical container rotatable on a horizontal axis and provided inside against the vertical wall at the large end with receptacles, such wall having openings therein between the axial center and the periphery thereof and at the edges of which said receptacles are arranged, an exterior delivery member with which said receptacles are adapted to be brought sequentially into communication through said openings, said delivery member being adjacent to the outer surface of said wall, means to rotate said container intermittently, and means to prevent said container from being rotated except in one direction.

4. A sugar dispenser comprising a conical container rotatable on a horizontal axis and provided inside against the vertical wall at the large end with receptacles, such wall having openings therein between the axial center and the periphery thereof and at the edges of which said receptacles are arranged, an exterior delivery member with which said receptacles are adapted to be brought sequentially into communication through said openings, said delivery member being adjacent to the outer surface of said wall, means to rotate said container, and means to hold said container at whatever point in its rotation it may be left by said rotating means.

5. In a sugar dispenser, a container rotatable on a horizontal axis, and provided inside against the vertical wall at one end with a receptacle which consists of a bottom member and a side member only, such wall having an opening therein between the axial center and the periphery thereof and at the edge of which said receptacle is located.

6. In a sugar dispenser, a rotatable container provided inside against the vertical wall at one end with a receptacle, such wall having an opening therein between the axial center and the periphery thereof and at the edge of which such receptacle is located, the latter consisting in part of a bottom member that inclines downward toward the end opening, when said receptacle is in delivery position.

7. In a sugar dispenser, a rotatable container provided inside against the vertical wall at one end with a receptacle, such wall having an opening therein between the axial center and the periphery thereof and at the edge of which such receptacle is located, the latter consisting of an inclined side member and an inclined bottom member which project partly over said opening behind.

8. In a sugar dispenser, a conical container having a filling opening in the conical part thereof, and provided with a post, a conical sleeve mounted to slide endwise on said conical part and slotted in its large end to receive said post, and a fastening member on said post.

9. The combination, in a sugar dispenser, with front and rear end supporting members, a chute, in said front-end member, opening through the back side of the same, and a rotatable conical container mounted between said end members with the large end at the front and in contact with said back side, said end having openings therein, and interior buckets arranged on said end at the edges of said openings and opening therethrough, said container openings being adapted to be brought into registry with the opening in said back side, of mechanism in said front-end member to rotate said container intermittently.

10. The combination, in a sugar dispenser, with front and rear end supporting members, a chute, in said front-end member, opening through the back side of the same, and a rotatable conical container mounted between said end members with the large end at the front and in contact with said back side, said end having openings therein, and interior buckets arranged on said end at the edges of said openings and opening therethrough, said container openings being adapted to be brought into registry with the opening in said back side, of mechanism in said front-end member, to rotate said container intermittently, and means in said rear-end supporting member to hold said retainer in whatever position it may be left by said mechanism.

11. The combination, in a sugar dispenser, with front and rear end supporting members, a chute, in said front-end member, opening through the back side thereof, and a rotatable conical container mounted between said end members, with the large end at the front and in contact with said back side, said end having openings therein, and interior buckets arranged on said end at the edges of said openings and opening therethrough, said container openings being adapted to be brought into registry with the opening in said back side, of mechanism in said front-end member to actuate said container through an arc of a circle equal to the distance between two of said buckets, and to stop the container when one of said buckets is in delivery position relative to said chute.

12. The combination, in a sugar dispenser, with front and rear end supporting members, a chute, in said front-end member, opening through the back side thereof, and a rotatable conical container mounted between said end members, with the large end at the front and in contact with said back side, said end having openings therein, and interior buckets arranged on said end at the edges of said openings and opening therethrough, said container openings being adapted to be brought into registry with the opening in said back side, of mechanism in said front-end member to actuate said container through an arc of a circle equal to the distance between two of said buckets, and to stop the container when one of said buckets is in delivery position relative to said chute, and means in said rear-end supporting member to prevent backlash on the part of the container.

13. The combination, in a sugar dispenser, with front and rear end supporting members, and a chute, in said front-end member, opening through the back side thereof, of a rotatable conical container mounted between said members, with the large end at the front, said container having an axial member that projects through said back side of said front-end member, and is provided with a ratchet-wheel, interior buckets at the front end of said container, said end having openings therein at the edges of which said buckets are arranged, and said container openings being adapted to be brought into registry with the opening in said front-end supporting member, a toothed segment mounted on said axial member and provided with a pawl for said ratchet-wheel, a second toothed segment mounted in said front-end supporting member to engage the first, and an operating lever for said second segment.

14. The combination, in a sugar dispenser, with a front-end housing, a chute in said housing, such chute opening through the back side of said housing, and a rear-end support, of a rotatable conical container mounted between said housing and said support, with the large end contiguous to the back of said housing and having openings therein, said container being provided with interior buckets at the front end, which buckets are arranged at the edges of said container openings, and the latter are adapted to be brought into registry with the opening in the back side of said housing, stop pins set in the front end of said container, ratchet mechanism in said housing for rotating said container, such mechanism consisting in part of a lever, and a movable member located in the path of said lever and adapted to be thrust by said lever into the path of any one of said stop pins.

15. The combination, in a sugar dispenser, with a front-end housing, a chute, in said housing, opening through the back side of the housing, and a rear-end support, of a rotatable conical container mounted between said housing and said support, with the large end against the back of said housing and having an annular groove in the face thereof that contacts with said housing, stop pins set in said groove, interior buckets at said large end, the latter having openings therein at the edges of which said buckets are arranged, and said container, openings being adapted to be brought into registry with the opening in the back side of said housing, ratchet mechanism in said housing for rotating said container, such mechanism consisting in part of a lever, and a movable member located in the path of said lever and adapted to be thrust by said lever into said groove and the path of an approaching stop pin.

16. The combination, in a sugar dispenser, with a front-end support having an opening therein, and a rear-end support, of a rotatable conical container mounted between said supports, with the large end contiguous to said front-end support, said end having openings therein, buckets arranged at the edges of said openings, on said large end, and opening through the same, said container openings being adapted to be brought into registry with said opening in said front-end support, and means to rotate said container and position said buckets, one after another, at said front-end support opening.

17. The combination, in a sugar dispenser, with a front-end support having an opening therein, and a rear-end housing, of a rotatable conical container mounted between said support and said housing, with the large end contiguous to said support, said end having openings therein, buckets arranged at the edges of said openings, on said large end, and opening through the same, said container openings being adapted to be brought into registry with the opening in said support, means to rotate said container and position said buckets sequentially at said support opening, and holding means for said container, such means comprising a spring-pressed member and engaging teeth at the end of said container which is supported by said housing.

18. The combination, in a sugar dispenser, with a front-end housing having a front with a slot therein, a chute in said housing, which chute opens through the back side thereof, and a back-end support, of a rotatable conical container mounted between said housing and said support, with its large end contiguous to said housing, said end having openings therein, and said container being provided with buckets which are arranged at the edges of said openings, the latter being adapted to be brought into agreement with the opening in the back side of said housing, actuating mechanism in said housing for said container, such mechanism consisting in part of a lever, an exterior arm, and a connection between said lever and arm, such connection passing through and operating in said slot.

19. The combination, in a sugar dispenser, with a front-end housing having a front with a slot therein, a chute in said housing, which chute opens at the top through the back side of said housing, and is provided at the bottom with a self-closing door, and a back-end support, of a conical container mounted to revolve between said housing and said support, with its large end contiguous to said housing, said end having openings therein, and said container being provided with buckets which are arranged at the edges of said openings, the latter being adapted to be brought into agreement with the opening in the back of said housing, actuating mechanism in said housing for said container, such mechanism consisting in part of a lever, an exterior arm and cover member, and a connection between said lever and arm, such connection passing through and operating in said slot, and said cover member always being over said slot regardless of the position of said connection therein.

20. In a sugar dispenser, a housing divided by ribs into a delivery chute and a compartment, operating mechanism in said compartment, a cover adapted to close the front of said housing, but having transparent parts to afford a view of the portions of the interior of said housing that are outside of said chute and compartment, and a movable container behind said housing and in operative position relative to said chute, such container being operated by said mechanism.

WALTER A. SMITH.
THOMAS L. FLYNN.

Witnesses:
F. A. CUTTER,
A. C. FAIRBANKS.

Copies of this patent may be obtained for five cents each, by addressing the "Commissioner of Patents, Washington, D. C."